US006928773B1

(12) United States Patent
Gardner

(10) Patent No.: US 6,928,773 B1
(45) Date of Patent: Aug. 16, 2005

(54) FLUSH-SEATING SLIDE-OUT ROOM FOR MOBILE LIVING QUARTERS

(76) Inventor: Stewart Gardner, 17812 C.R. 10, Bristol, IN (US) 46507

( * ) Notice: Subject to any disclaimer, the term of this patent is extended or adjusted under 35 U.S.C. 154(b) by 34 days.

(21) Appl. No.: 10/354,736

(22) Filed: Jan. 30, 2003

Related U.S. Application Data

(63) Continuation-in-part of application No. 10/285,357, filed on Oct. 31, 2002, now abandoned.

(51) Int. Cl.[7] .................................................. B60P 3/34
(52) U.S. Cl. ........................ 52/67; 52/143; 296/26.01; 296/175
(58) Field of Search ................. 52/67, 143; 296/26.12, 296/26.13, 26.14, 26.08, 26.09, 26.01, 26.1, 296/165, 171, 175

(56) References Cited

U.S. PATENT DOCUMENTS

| 3,952,464 | A | * | 4/1976 | Stupak ........................... 52/72 |
| 5,570,924 | A | * | 11/1996 | Few et al. ................... 296/175 |
| 5,577,351 | A | * | 11/1996 | Dewald et al. ................. 52/67 |
| 5,620,224 | A | * | 4/1997 | DiBiagio et al. ......... 296/26.13 |
| 5,634,683 | A | * | 6/1997 | Young ......................... 296/165 |
| 5,787,650 | A | * | 8/1998 | Miller et al. ................... 52/67 |
| 5,971,471 | A | * | 10/1999 | Gardner ...................... 296/165 |
| 6,108,983 | A | * | 8/2000 | Dewald et al. ................. 52/67 |
| 6,152,520 | A | * | 11/2000 | Gardner ...................... 296/175 |
| 6,266,931 | B1 | * | 7/2001 | Erickson et al. ............... 52/67 |
| 6,471,275 | B1 | * | 10/2002 | Kunz et al. .............. 396/26.01 |
| 6,533,338 | B1 | * | 3/2003 | Frerichs et al. .......... 296/26.14 |
| 2002/0187675 | A1 | * | 12/2002 | McMullin et al. .......... 439/501 |

FOREIGN PATENT DOCUMENTS

DE 3143713 A1 * 5/1983 ............. B60S 9/08

* cited by examiner

Primary Examiner—Peter M. Cuomo
Assistant Examiner—Stephen D'Adamo

(57) ABSTRACT

A slide-out room for mobile living quarters is moved between a retracted position above the main floor of the main living area to an extended position with the auxiliary floor substantially flush with the main floor by engaging an extendable drive connected at one point to the slide-out room and connected at a second point to the main living area structure. The actuating system accommodates up and down movement of the auxiliary floor when the slide-out room is shifted. A cord retractor attachable to said mobile living quarters allows a power cord or other similarly flexible wires or tubing to be extended away from the main living area in conjunction with extension of the slide-out room. When the slide-out room is retracted, the cord retractor urges the cord to a resting position between the auxiliary floor and sub-floor in conjunction with the retraction of the slide-out room and prevents binding or bunching of the cord.

9 Claims, 10 Drawing Sheets

FLUSH-SEATING SLIDE-OUT ROOM FOR MOBILE LIVING QUARTERS

This Application is a continuation-in-part of U.S. patent application Ser. No. 10/285,357, of the same name and applicant, filed on 31 Oct. 2002, now abandoned.

FIELD OF THE INVENTION

The present invention relates to a slide-out room that may be extended from the main living area of mobile living quarters, thereby providing a larger living space when desired.

BACKGROUND OF THE INVENTION

The usable living area in mobile living quarters, such as recreational vehicles, is severely limited by practical physical constraints for safe navigation of a roadway. Accordingly, it has become common in the industry to provide a slide-out room that can be moved between an extended position and a retracted position, thereby providing a convenient means of gaining additional auxiliary usable living space while the vehicle is stationary. In the extended position, the slide-out room protrudes out from the main living area of such mobile living quarters. In the retracted position, the slide-out room is positioned within the main living area of the vehicle so that the vehicle may be safely operated on a roadway.

For such a slide-out room, it is desirable for the floor of the room to be substantially flush and parallel to the floor of the main living area when extended in order to maximize the comfort and safety of any occupants. It is also desirable to have an actuating mechanism for moving the room between the retracted and extended positions that is contained entirely within the boundaries of the mobile living quarters in order to protect the actuating mechanism from the weather and other harsh environmental conditions that may hinder the operation and endurance of the mechanism. Slide-out rooms already known in the art, such as shown in U.S. Pat. Nos. 5,620,224 and 5,787,650, often have a combined support and actuating mechanism including extendable cantilever supports that are at least partially exterior to the living area and exposed to the weather and other environmental factors. Furthermore, although a suspended slide-out room is known, it was heretofore unknown how to provide such a room that easily seats flush with the main floor when extended by an actuating mechanism located entirely within the interior of the living area.

Another problem encountered with a slide out room is that the power cord that extends from the main living area structure to power a motor to drive the actuating mechanism for shifting the slide-out room is susceptible to bunching and binding between the slide-out room and main living area structure when the slide-out room is shifted from its extended position to its retracted position. It would be desirable, therefore, to have a mechanism that would prevent bunching and binding of the cord.

SUMMARY OF THE INVENTION

The slide-out or reciprocating room of this invention reveals an auxiliary floor supported over the main floor of the main living area structure. The slide-out room is moved through an aperture in a wall of the main living area structure between retracted and extended positions by an extendable actuating mechanism, which facilitates movement of the auxiliary floor between a position above the main floor when the slide-out room is fully retracted to a position substantially flush and parallel with the main floor when the slide-out room is fully extended. The actuating mechanism is entirely enclosed within the interior of the living area and is shiftable to allow the slide-out room to shift downwardly as it moves into its extended position with the auxiliary floor being flush with the main floor.

An extendable retraction device permits a cord extending between the main living quarters and the slide-out room to be located between the auxiliary floor and the main floor. The cord can extend outward with the slide-out room when the room is extended. The retraction device prevents the cord from bunching or binding by keeping the cord relatively taught and retracting the cord as the slide-out room retracts.

One object of this invention to provide mobile living quarters with a slide-out room that seats flush with the main floor of the mobile living quarters. Another objective is to provide an actuating mechanism for such a flush-seating slide-out room that is located on the interior of the mobile living quarters.

Another object of this invention is to provide a device that will prevent a power cord attached to the slide-out room actuator from bunching or binding when moved along with the slide-out room between extended and retracted positions.

BRIEF DESCRIPTION OF THE DRAWINGS

These and other aspects of the invention will be apparent from the following description, with reference to the accompanying drawings, in which.

DETAILED DESCRIPTION OF THE ILLUSTRATED EMBODIMENT

Figure 1:
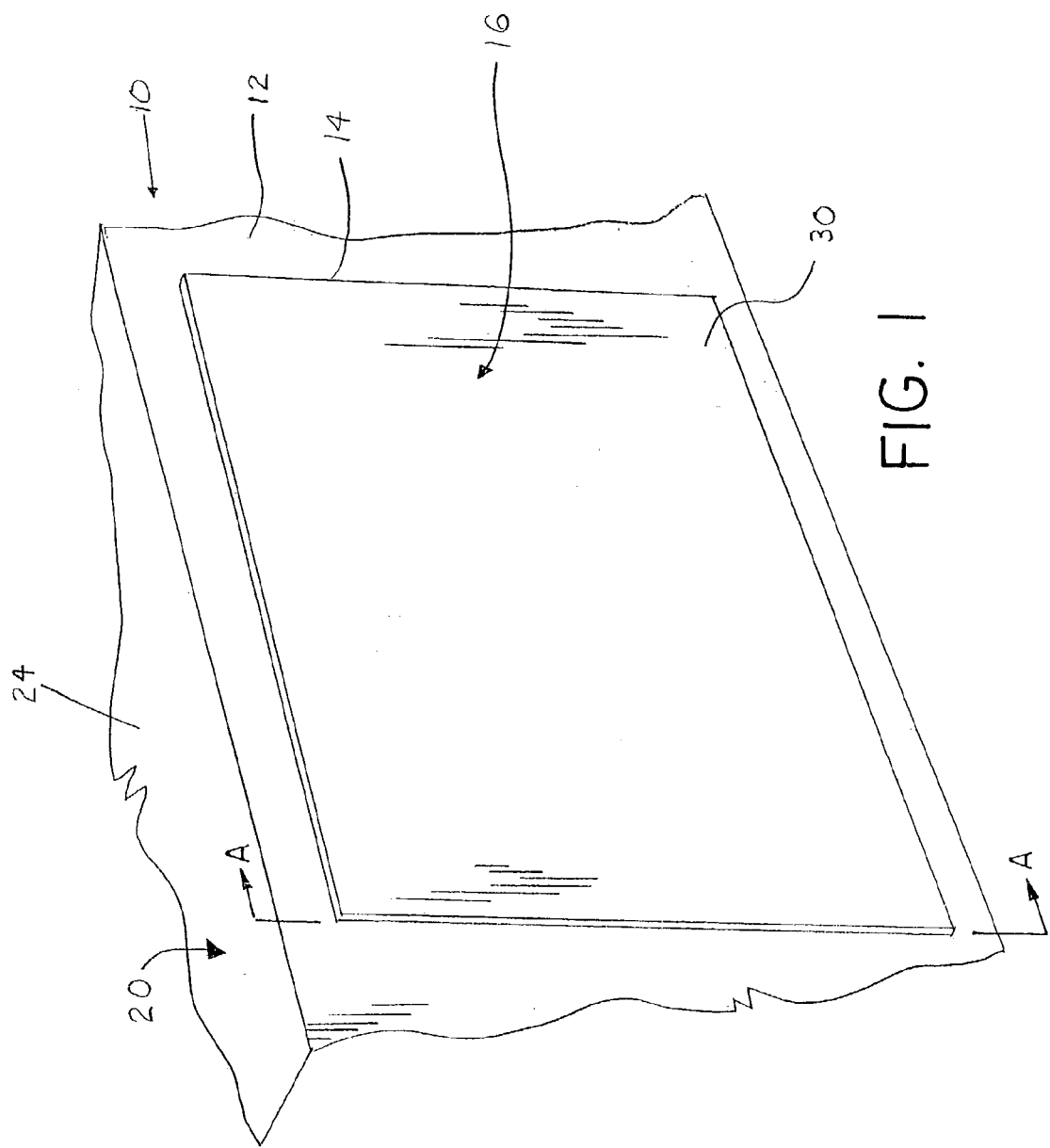
FIG. 1 is a perspective view of the slide-out room in its fully retracted position.
Figure 2:
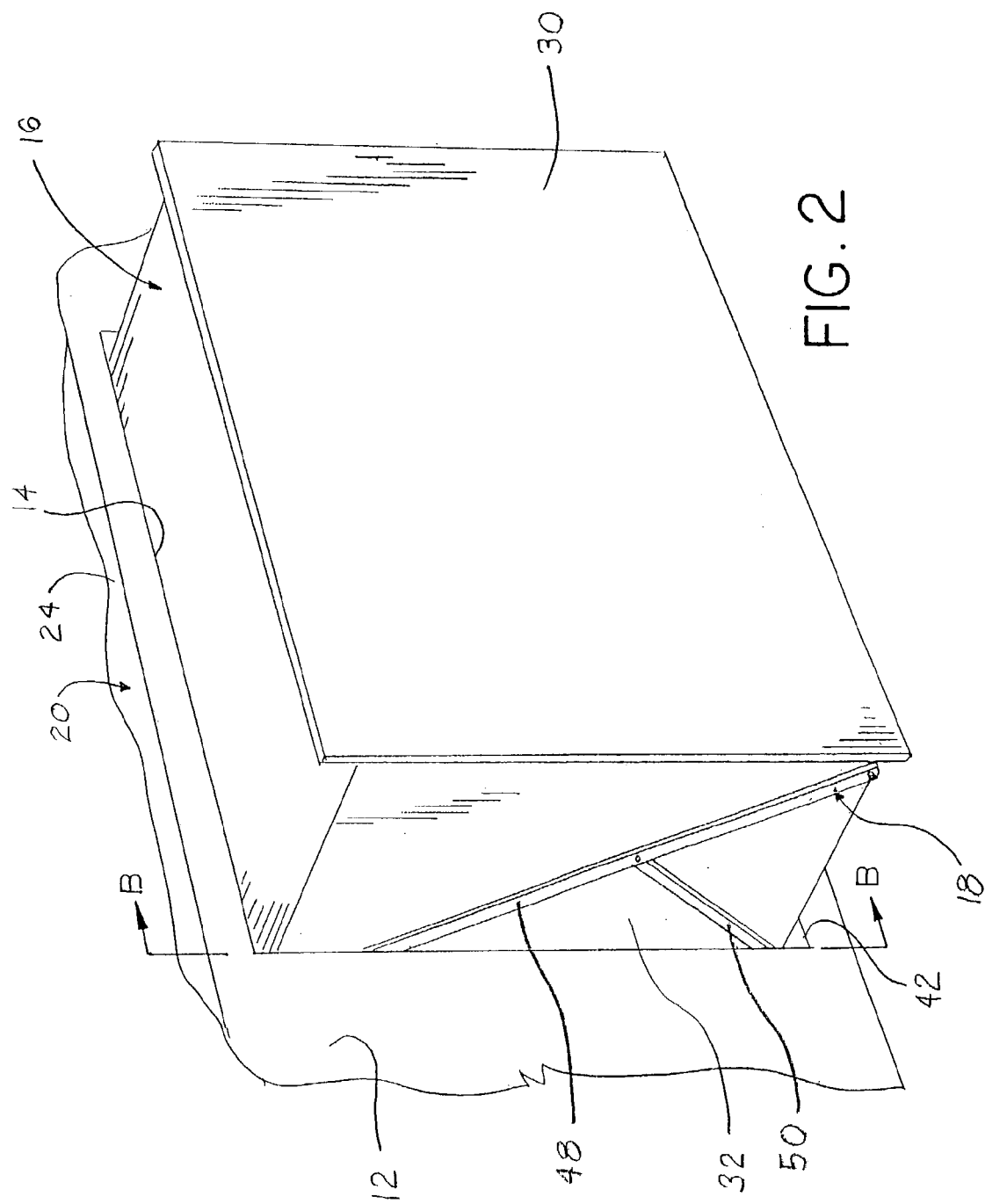
FIG. 2 is a perspective view of the slide-out room in its fully extended position.
Figure 3:
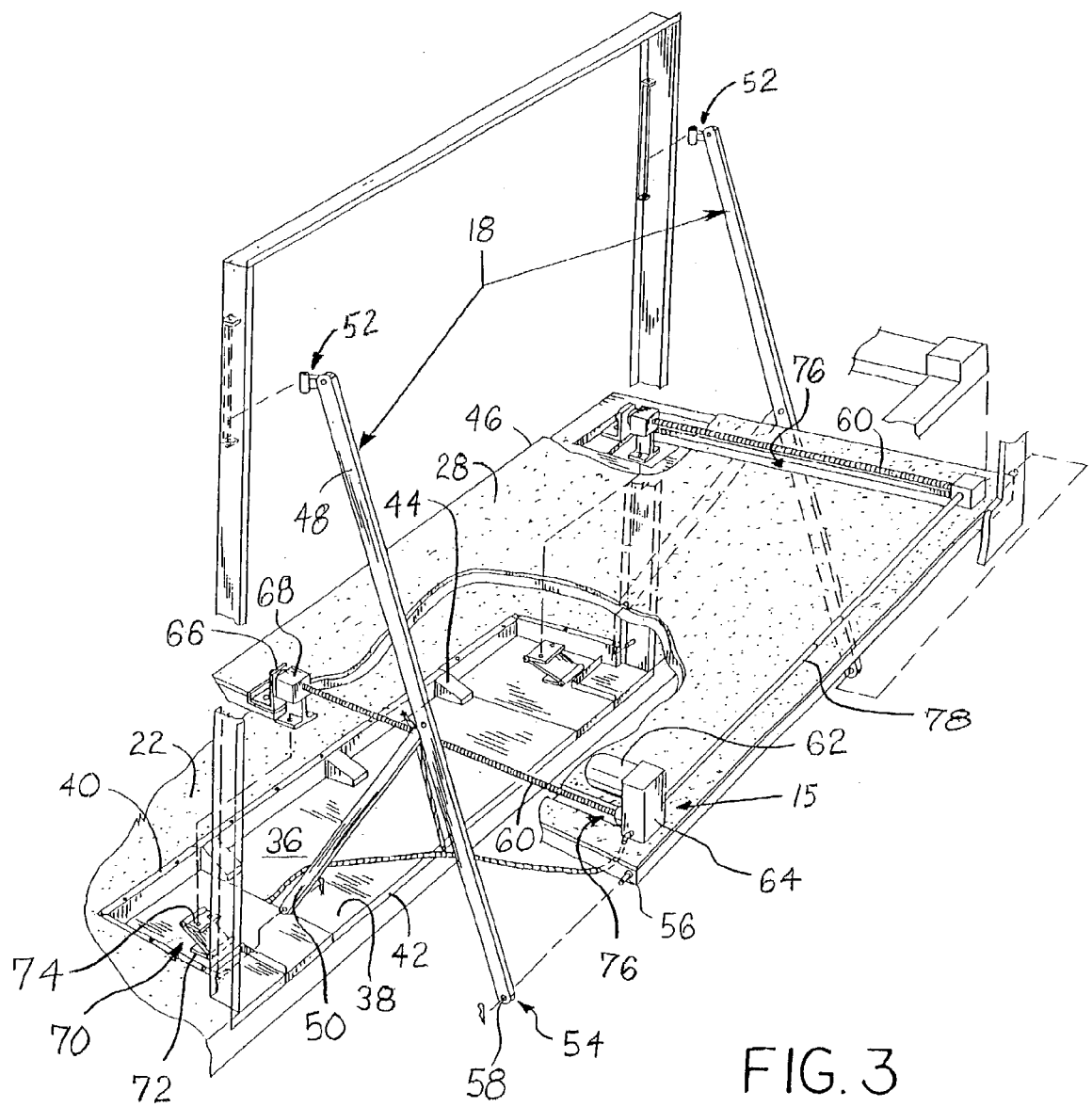
FIG. 3 is an exploded cutaway view of the main living area structure with the slide-out room in its extended position.

Referring now to the drawings, a mobile living quarters (10) is presented. Mobile living quarters (10) includes a sidewall (12), which defines an aperture (14). A slide-out room (16) is supported by living quarters (10) on a carriage linkage (18), and is moved by an actuation system (15)

through the aperture (14) in the living quarters between a retracted position and an extended position. The mobile living quarters (10) has a main living area structure (20) including a main floor (22), a ceiling (24), and sidewalls (12), the combination of which defines a main living area, generally indicated by the numeral (26). Slide-out room (16) includes an auxiliary floor (28), an auxiliary front wall (30), and auxiliary sidewalls (32), the combination of which defines an auxiliary living area, generally indicated by the numeral (34).

A recess (36) is located in the main floor (22) to accept the slide-out room (16) when in its extended position such that the auxiliary floor (28) is substantially flush with and parallel to the main floor (22). The recess (36) is defined by a sub-floor (38) located lower than the main floor (22) and extending between a front edge (40) of the main floor (22) and an exterior edge (42) of the sub-floor (38). Front edge (40) is located interiorly from the sidewall (12) of the main living area structure (20), and the exterior edge (42) defines one side of the aperture (14).

To aid in the motion of the auxiliary floor (28) between the extended and retracted positions of the slide-out room (22), a ramp (44) is located along the front edge (40) of the main floor (22) sloping between the main floor and the sub-floor (38). The ramp (44) facilitates movement of the auxiliary floor (28) between its flush seated position over the sub-floor when the slide-out room (16) is extended and its position over the main floor (22) when the slide-out room (16) is retracted. To further facilitate such movement, the interior edge (46) of the auxiliary floor (28) is beveled complimentarily to the ramp (44) such that the auxiliary floor (28) may move along the ramp (44) as it moves into and out of the recess (36). The combination of the ramp (44) and beveled interior edge (46) also allows the interior edge of the auxiliary floor (28) to lie directly adjacent to and flush with the front edge (40) of the main floor (22) when the slide-out room (16) is fully extended.

The carriage linkage (18)—or three-point linkage—which supports the slide-out room (16) from the main living area structure (20) may include a pair of parallel linkages as described in U.S. Pat. No. 6,164,652, incorporated by reference herein. Each linkage includes a primary link (48) and a secondary link (50). The primary link (48) is connected at one end by a slidable pivot connection (52) to the main living area structure (20) and is connected at the other end by a pivot connection (54) to the slide-out room (16). Pivot connection (54) includes a pivot pin (56), which is attached to the auxiliary floor (28) and which protrudes through a pivot hole (58) in the primary link (48). The pivot hole (58) is preferably slotted longitudinally along the primary link (48) to prevent any binding that may occur during the opening and closing movement of the slide-out room (16).

The actuating system (15) includes an extendable drive for moving the slide-out room (16) between its retracted and extended positions. This drive is shown to be a jack screw (60) drive using a gear nut (68). A ball screw drive could also be used. The actuating system includes a drive mechanism (62) and an attached gear box (64), which in turn is attached to auxiliary floor (28). The drive mechanism (62) is preferably an electric motor, but it may also be a manually activated drive or any equivalent drive. Drive mechanism (62) is drive connected by the gear box (64) to one end of jack screw (60), which is positioned longitudinally along the general path of movement of the slide-out room (16). Jack screw (60) is rotationally connected at its other end to a bearing end block (66), which is connected the auxiliary floor (28).

Gear nut (68) is threadedly connected to the jack screw (60) at a point between the end block (66) and gear box (64). The gear nut (68) is also anchored to the main living area structure (20) such that, when the jack screw (60) is rotated by drive mechanism (62), the jack screw (60) and slide-out room (16) move inward or outward relative to the main living area structure (20), depending on the direction of rotation of the jack screw. In moving between its extended and retracted positions, slide-out room (16) and attached jack screw (60) tilt and raise or lower due to the movement of the slide-out room (16) over ramp (44). This tilting and raising or lowering movement of the jack screw (60) relative to main floor (22) is accommodated as shown in FIGS. 5 and 6 by a dual-axis, three leaf hinge—or Z-hinge—(70), having its lower leaf (72) rigidly connected to the sub-floor (38) and its upper leaf (74) rigidly connected to the gear nut (68).

A slideway (76) in the auxiliary floor (28) extends longitudinally along the path of the jack screw (60) to facilitate movement of the slide-out room (16) about gear nut (68) when the jack screw (60) is rotated to shift the slide-out room (16) between its extended and retracted positions. The drive mechanism (62), gear box (64), jack screw (60), gear nut (68), and end block (66) are located on the interior of the slide-out room (16), which protects these components from the weather and other exterior environmental factors.

In the depicted embodiment, the complete actuating mechanism includes two parallel sets of the above described actuating systems—namely two gear boxes (64), two jack screws (60), two end blocks (66), two gear nuts (68), two Z-hinges (70), and two corresponding slideways (76)—located on opposite sides of the auxiliary floor (28) A drive shaft (78) extends between the gear boxes (64) to allow drive mechanism (62) to cause the simultaneous rotation of both jack screws (60). The two parallel actuating systems are geared and sized such that each system moves essentially parallel with each other in order that both sides of the slide-out room (16) move in and out of the main living area (26) without significant twisting or skewing of the slide-out room (16).

Figure 4:
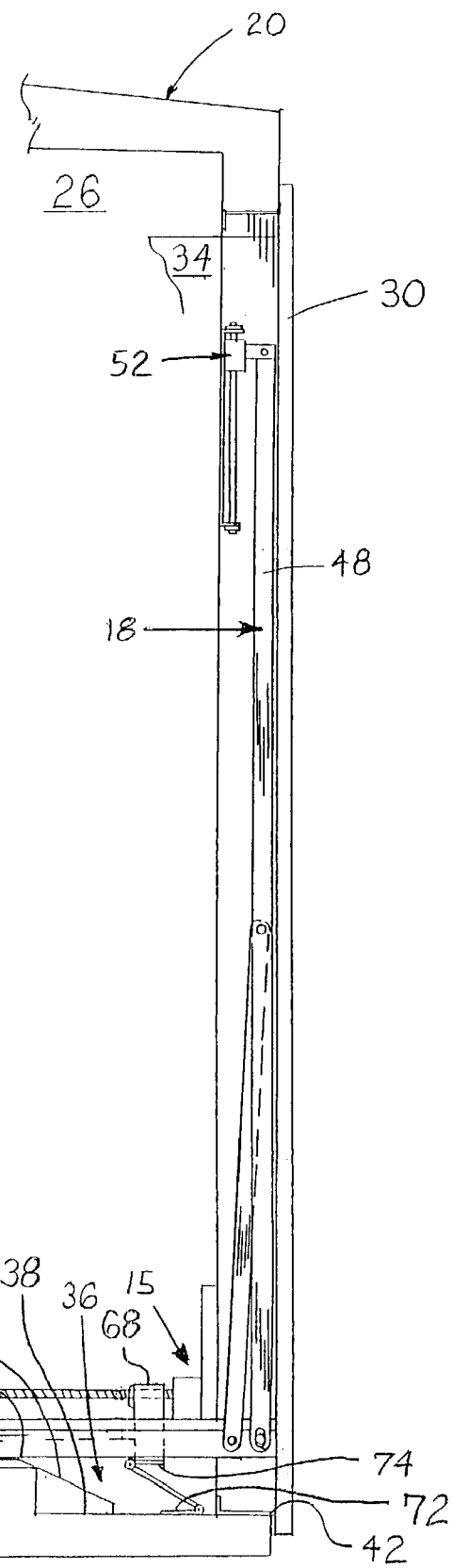
FIG. 4 is a cross-sectional view of the main living area structure with the slide-out room in its fully retracted position taken substantially along line A—A of FIG. 1.
Figure 5:
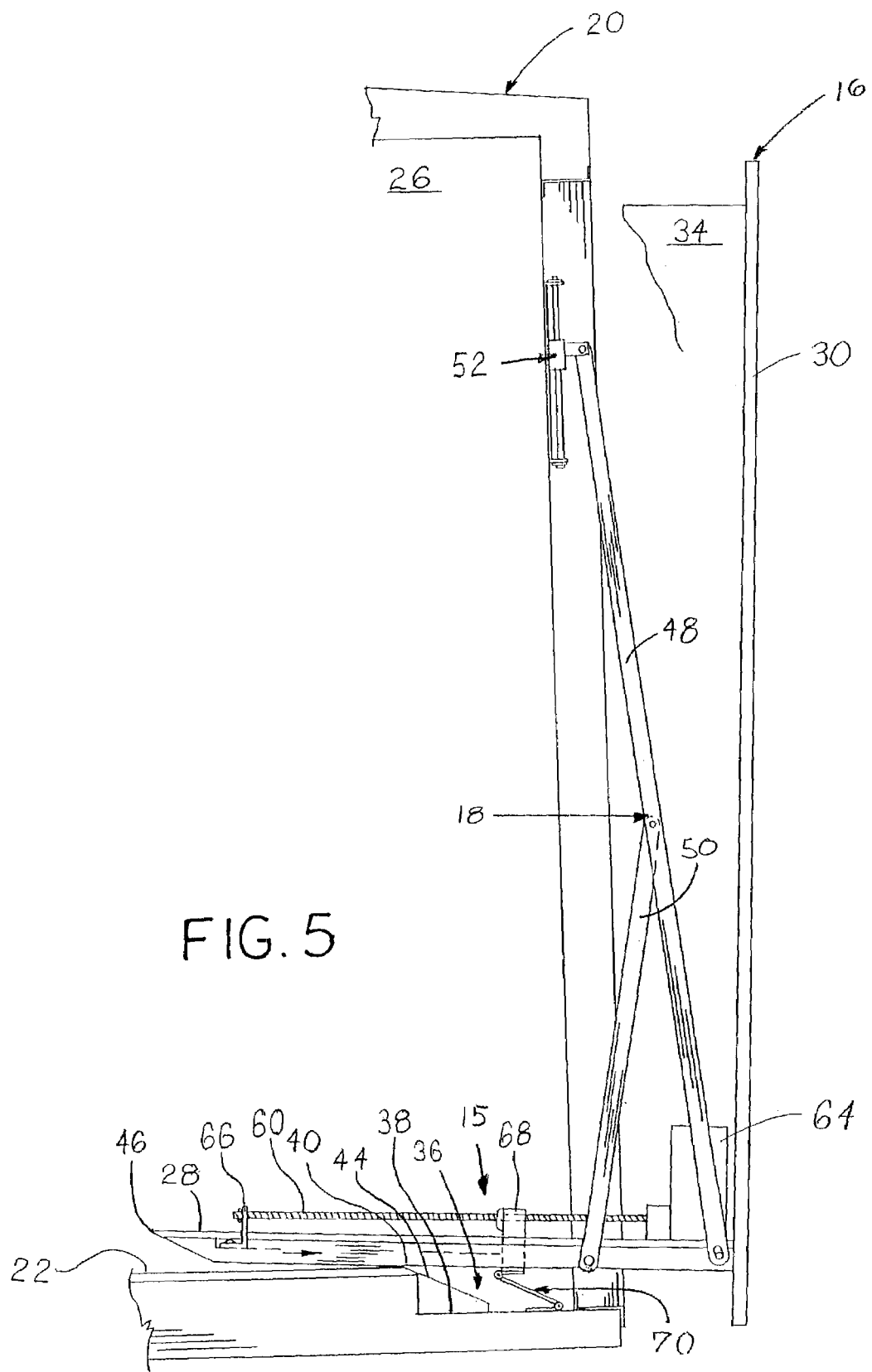
FIG. 5 is a cross-sectional view of the slide-out room shown in a first intermediate position.
Figure 6:
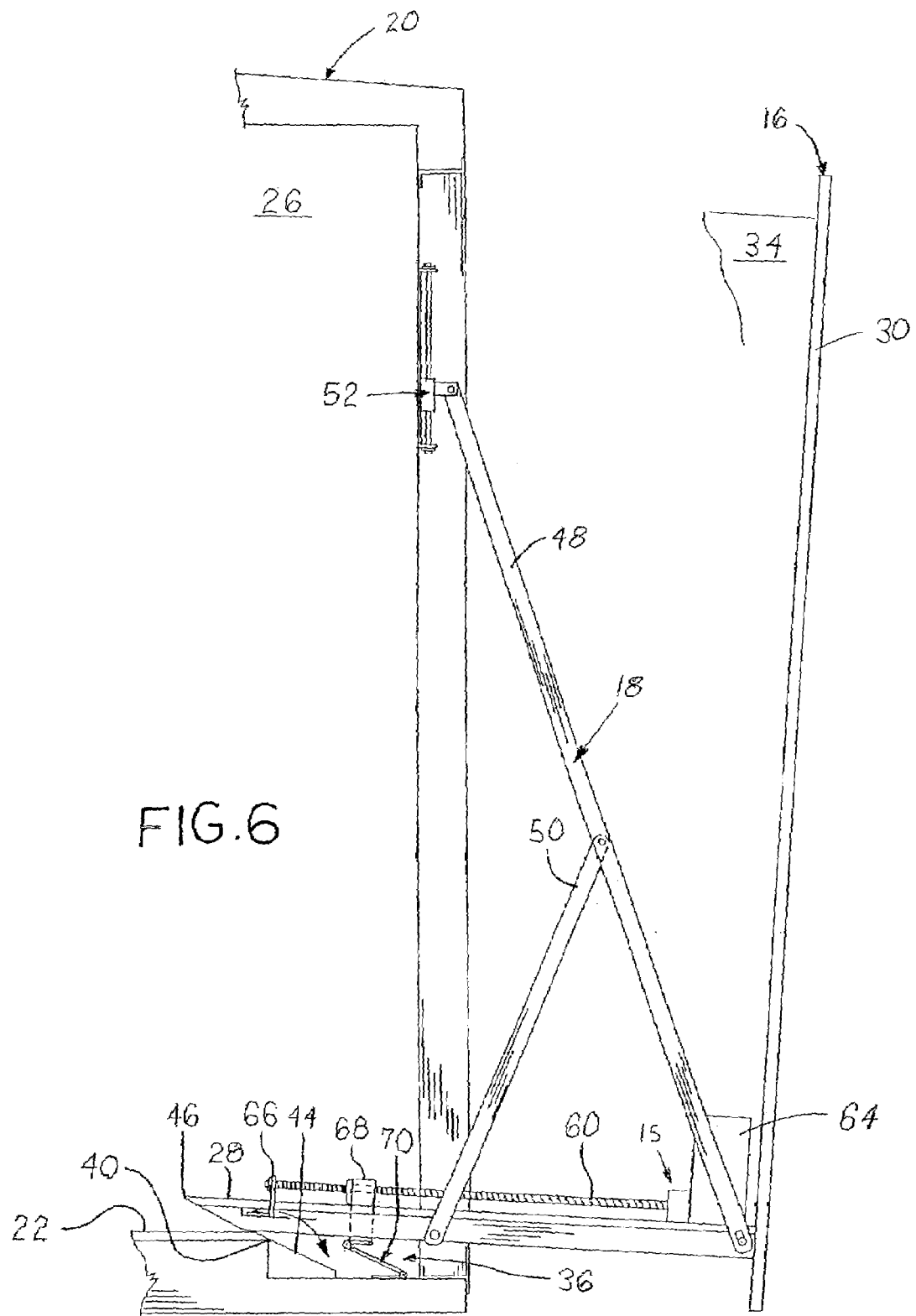
FIG. 6 is a cross-sectional view of the slide-out room shown in a second intermediate position.
Figure 7:
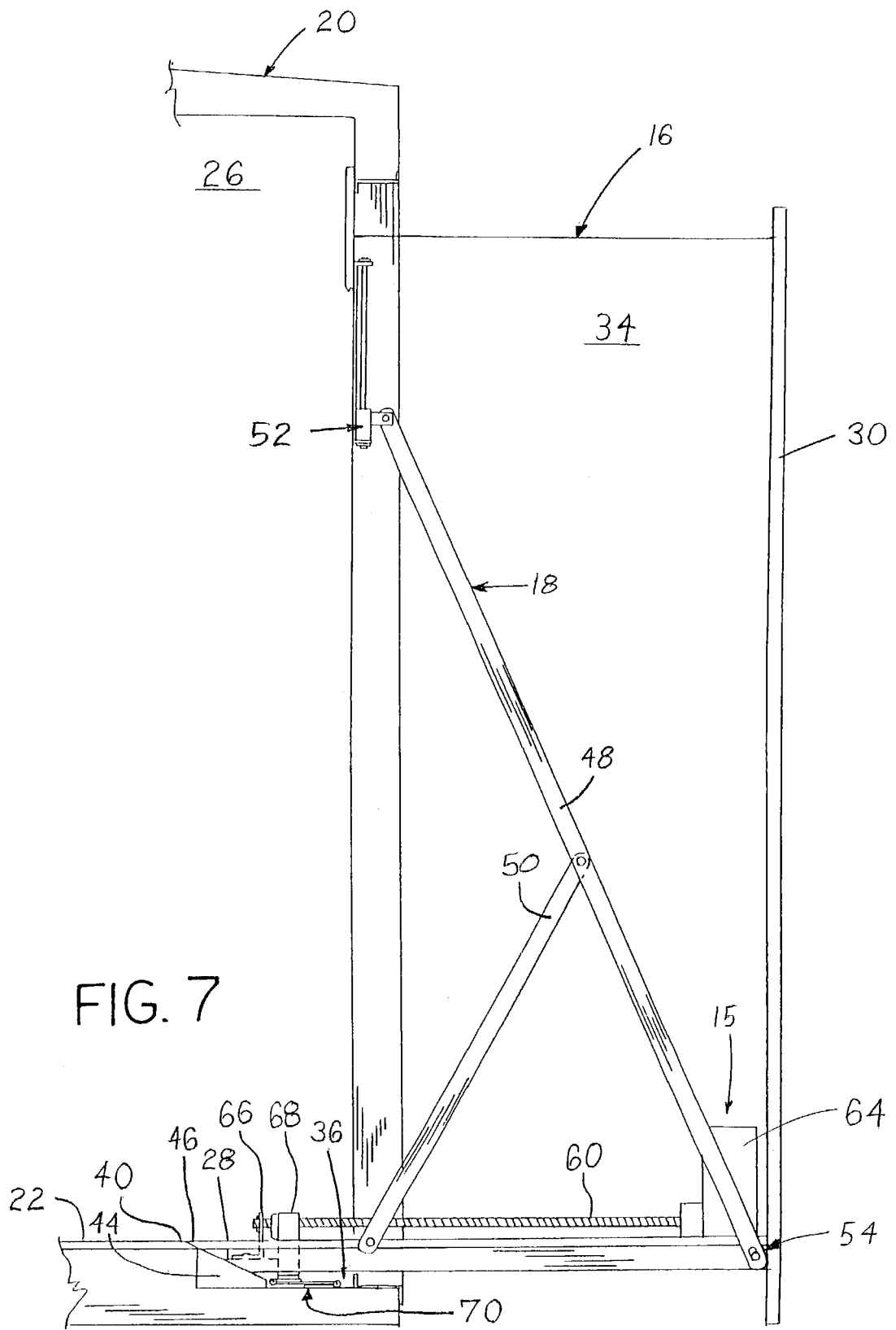
FIG. 7 is a cross-sectional view of the main living area structure with the slide-out room in its fully extended position taken substantially along line B—B of FIG. 2.

In operation, the slide-out room (16) moves between a retracted position substantially inside the main living area (26), as depicted in FIG. 4, through successive intermediate positions, depicted in FIG. 5 and FIG. 6, to an extended position, depicted in FIG. 7, when the actuating mechanism is actuated in one direction. The slide-out room (16) can then be returned in reverse succession through the intermediate positions to the retracted position by reversing the direction of the actuating mechanism. In the depicted embodiment, the drive mechanism (62) is electrically activated to turn the jack screws (60) against the gear nuts (68), thereby forcing the slide-out room (16) to move outward from the main living area (26) through the aperture (14) to the extended position. During this process, the auxiliary floor (28) moves from a position above and substantially parallel to the main floor (22), laterally along the main floor (22) until the beveled interior edge of the auxiliary floor (42) meets the ramp (44), at which time the auxiliary floor (28) swings downward and outward along the ramp (44) until coming to rest at the fully extended position with the auxiliary floor (28) flush with the main floor (22). Although not shown here, rollers or some other friction reducing device could be positioned between the auxiliary floor (28) and main floor (22) to reduce the force necessary to move the slide-out room (16). While extending or retracting the slide-out room (16), the Z-hinges (70) facilitate the raising and lowering movement of the gear nuts (68) caused by the corresponding shifting movement of the auxiliary floor (28) as it slides over the main floor (22), across the ramp (44), to or from a position over the sub-floor (38). The Z-hinges (70) simultaneously resist lateral movement of gear nuts (68) upon rotation of the jack screws (60). When the slide-out room (16) is fully extended, the drive mechanism (62) is stopped, thereby stopping the rotation of the jack screws (60) against the gear nuts (68) and the movement of the slide-out room (16). The slide-out room (16) may then be moved from the extended position to the retracted position by reversing the rotation of the screw jacks (60), which reverses the above described process, stopping said rotation when the slide-out room (16) is fully retracted.

Figure 8:
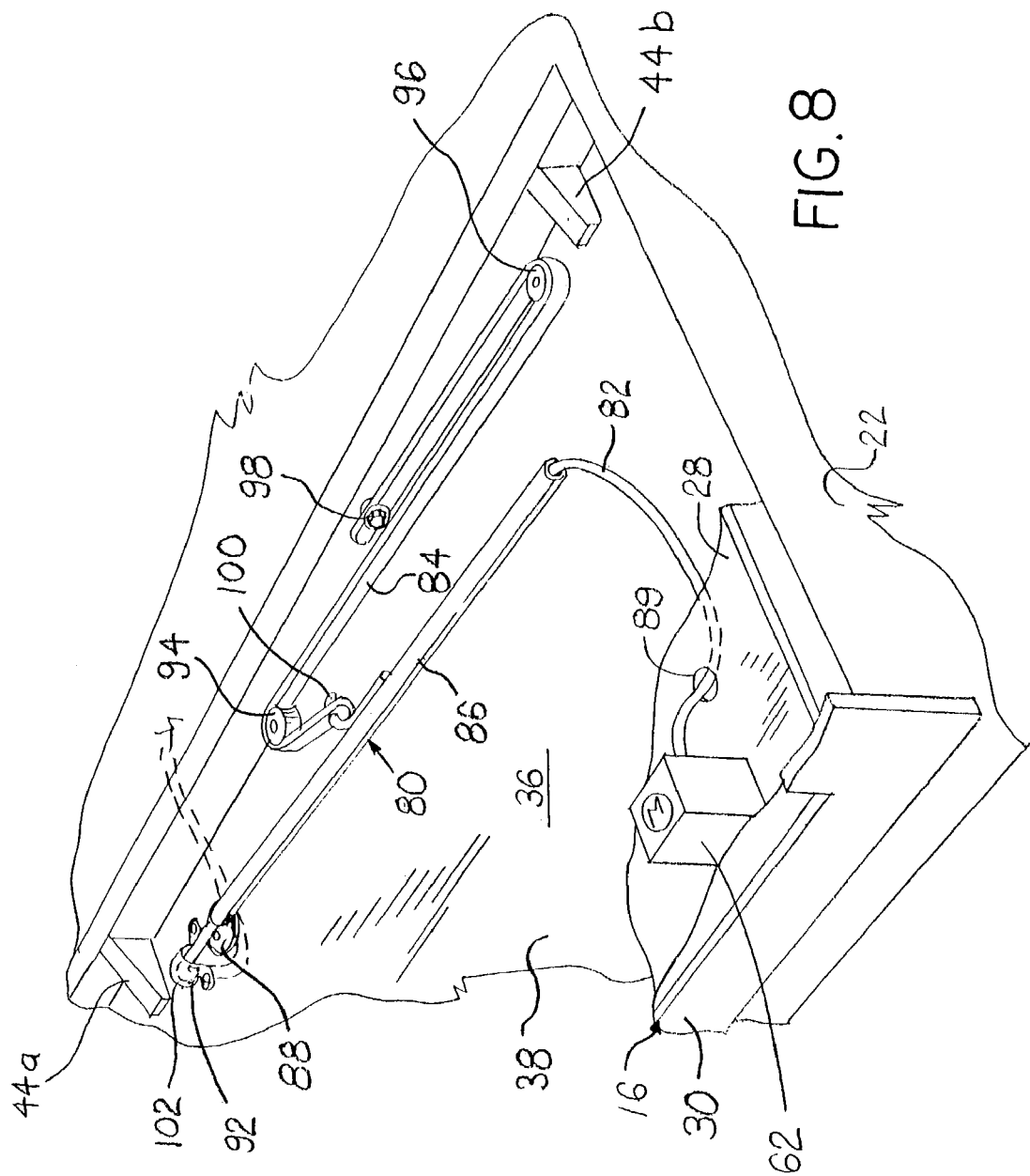
FIG. 8 is a perspective view of the slide-out room in its retracted position with part of the auxiliary floor cut away to show the cord retractor.
Figure 9:
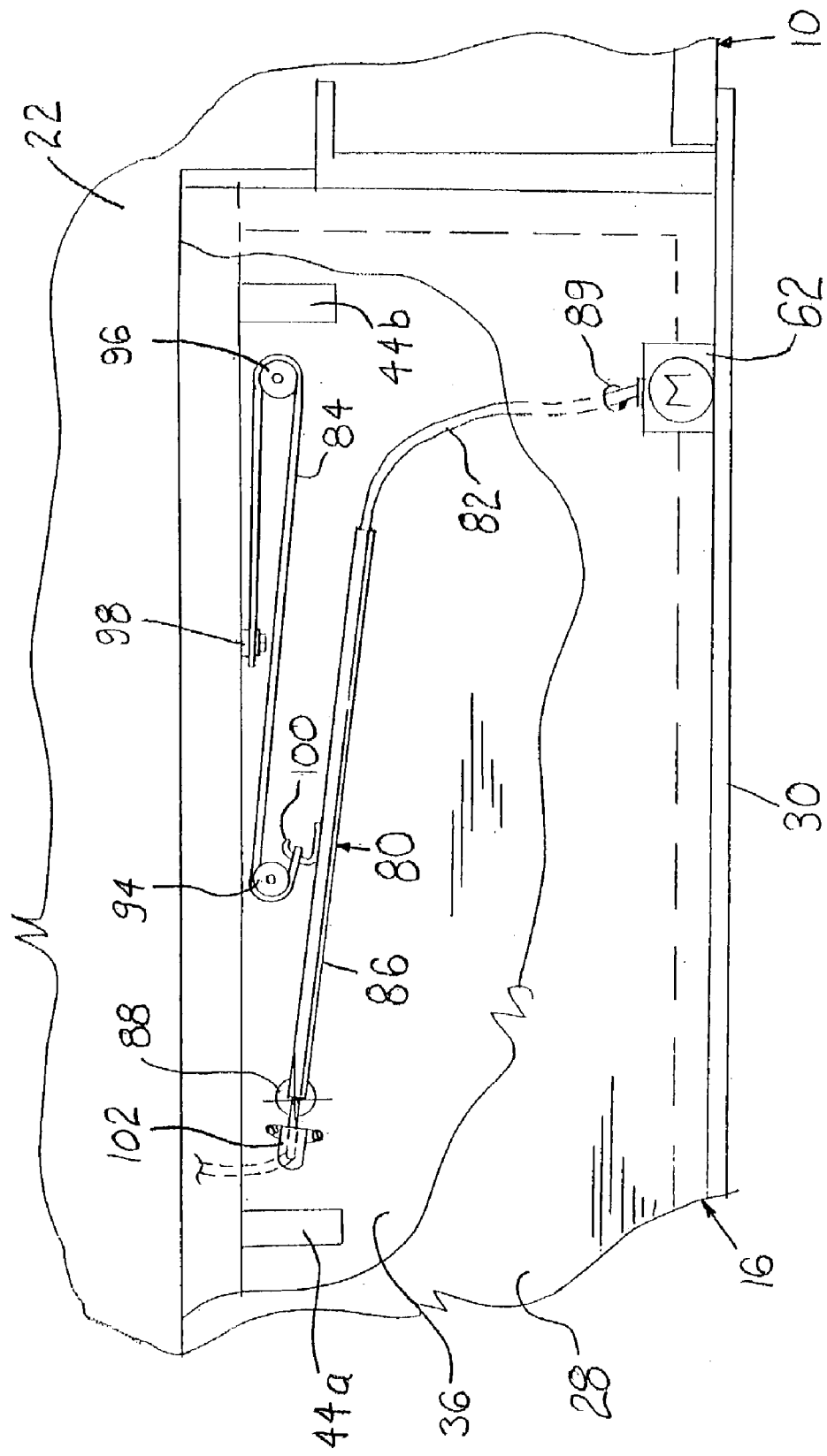
FIG. 9 is a plan view of the slide-out room in its retracted position with part of the auxiliary floor cut away to show the cord retractor in its retracted position.
Figure 10:
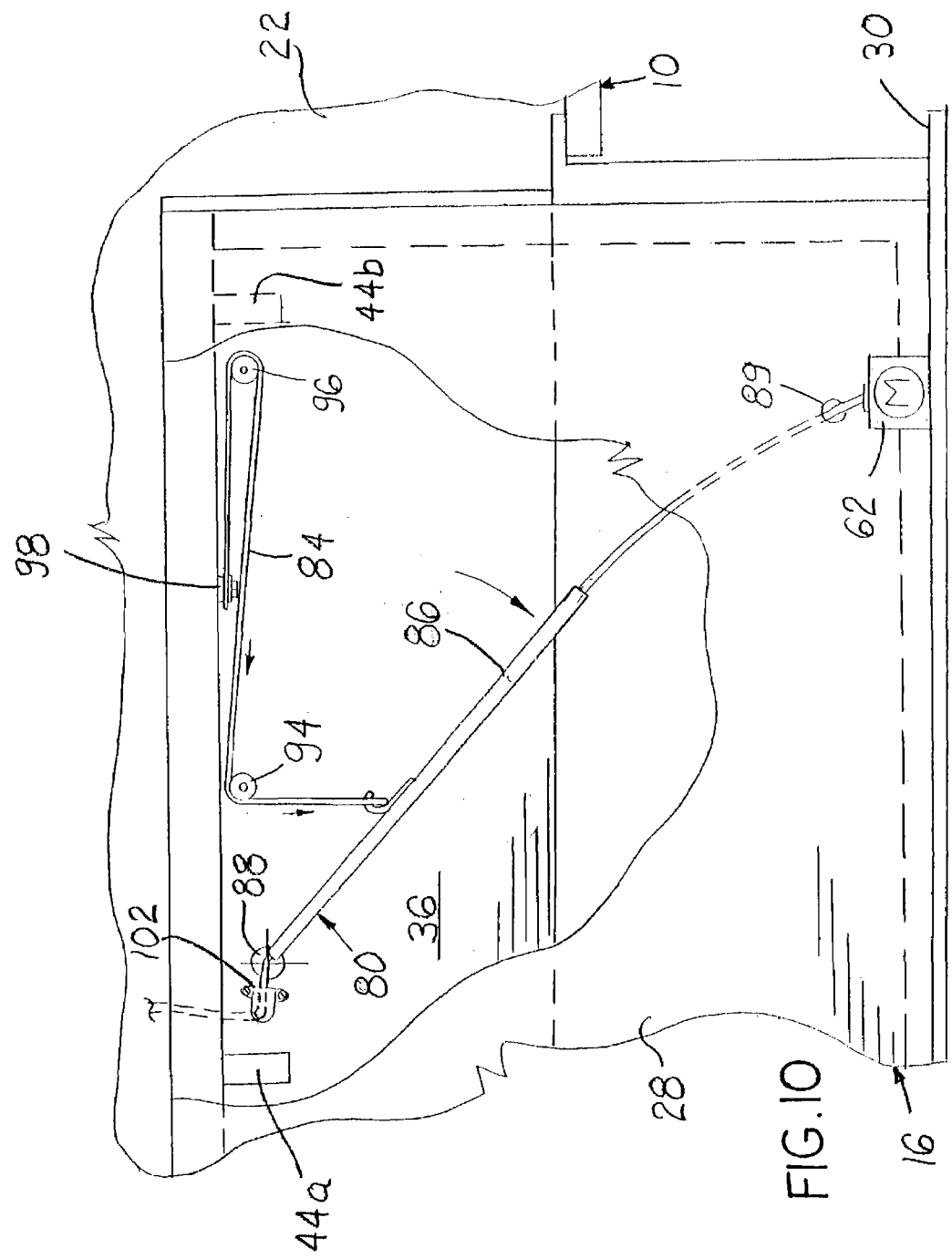
FIG. 10 is a plan view of the slide-out room in its extended position with part of the auxiliary floor cut away to show the cord retractor in its extended position.

Referring now to FIGS. 8–10, cord retractor (80), including a swing arm (86) and a resilient retraction member (84), is mounted on sub-floor (38) in recess (36) to prevent power cord (82) from bunching or binding against either the sub-floor or auxiliary floor (28) when slide-out room (16) shifts between extended and retracted positions. Power cord (82) extends between drive mechanism (62) and an electrical power source within the living quarters (20). In its retracted position, cord retractor (80) fits essentially between adjacent ramps (44a, 44b) and between auxiliary floor (28) and sub-floor (38). In its extended position, cord retractor pivots to extend outwardly between sub-floor (38) and auxiliary floor (28), allowing power cord (82) to remain connected to drive mechanism (62) under slide-out room (16) when the room is in its extended position.

Resilient member (84), which may be a rubber band, bungee cord, or any similar flexibly stretchy device, is attached to the interior edge of recess (36) at one end by a fastener (98) and to swing arm (86) at the other end by a connector (100). Connector (100) is preferably placed near the midpoint of swing arm (86), but may be adjusted to obtain a preferred amount of travel and moment forces generated by resilient member when swing arm is shifted between retracted and extended position.

Two guide rollers (94, 96), which are rotationally attached to sub-floor (38), dictate the path of motion of resilient member (84) between extended and retracted positions and maintains tension upon the resilient member. Guide rollers (94, 96) preferably are located essentially parallel with the interior wall of recess (36) and between ramps (44a, 44b) with resilient member (84) threaded about guide rollers (96) in an S-like fashion. The end part of resilient member attached to connector (100) extends about guide roller (94) nearest the connector, and the opposite end part of the resilient member extends about guide roller (96) farthest from the connector. The locations of guide rollers (94, 96) may be varied according to the desired amount of percent elongation of resilient member (84), the desired direction and placement of retractive force on swing arm (86), and the desired overall elongation of the resilient member.

Swing arm (86) is an elongated piece of stiff, hollow tubing through which power cord (82) is threaded. Other variations, such as connecting wires to the outside of a solid member are also contemplated. Swing arm (86) is pivotally mounted to sub-floor (38) at one end by pivot connection (88), allowing rotational movement of the arm through an arc above and essentially parallel to the sub-floor. Swing arm (86) is attached to sub-floor (38) at pivotal connection (88) between adjacent ramps (44) such that the swing arm and resilient member (84) are located essentially between the ramps when cord retractor (80) is retracted, thereby allowing auxiliary floor (38) to pass over cord retractor (80) when slide-out room (16) is shifted between its extended and retracted positions. The motion of swing arm (86) remains adjacent sub-floor (38) through the entire arc of travel, thereby allowing the swing arm to remain within recess (36) between sub-floor (38) and auxiliary floor (28) when slide-out (16) room is extended.

Cord (82) for activating drive mechanism (62) comes from the living quarter's electric system (not shown), into recess (36) through an opening (92) in sub-floor (38) located adjacent the radius point of pivot connection (88). From there, cord (82) is threaded into the near end of swing arm (86) directly adjacent the pivot connection (88), exit out the opposite end of the swing arm, and extend through a hole (89) in auxiliary floor (28) where they are connected to drive mechanism (62). A relatively short length of cord (82) is exposed between floor opening (92) and swing arm (86), with the cord exiting the floor opening further protected from abrasion by a cap (102) placed over the opening. A relatively longer length of cord (82) exposed between the swinging end of swing arm (86) and the connection to drive mechanism (62), which allows the cord to accommodate movement of the swing arm when slide-out room (16) is shifted between extended and retracted positions.

In operation, cord retractor (80) is at rest in its retracted position as shown in FIG. 9. When slide-out room (16) is shifted by actuating system (15) from its retracted position to its extended position, as shown in FIG. 10, cord (82) is pulled outwardly along with drive mechanism (62), thereby causing swing arm (86) to pivot outwardly about pivot connection (88). Outward shifting of the swing arm (86) causes resilient member (84) to stretch, which creates an increasing force on swing arm in the direction of its retracted position. The amount of said force can be adjusted by varying the point of attachment at connector (100) along the length of swing arm (86) and position of guide rollers (94, 96). When slide-out room (16) is shifted back to its retracted position from its extended position, the pulling force on swing arm (86) from the stretched resilient member (84) causes the swing arm to return to its retracted position in conjunction with the retracting motion of the slide-out room and the drive mechanism (62). Cord retractor (80) thereby prevents cord (82) from bunching and potential binding between auxiliary floor (28) and sub-floor (38) by keeping the cord relatively taught at all times. The entire range of motion of cord retractor (80) is contained essentially within the plane between the sub-floor (38) and the auxiliary floor (28), and between ramps (44a and 44b).

The above description is exemplary only in order to instruct on how to make and use the preferred embodiment of the invention. It is not intended to limit the claimed invention from minor or obvious variations, all of which are expressly included herein.

I claim:

1. Mobile living quarters with a flush-seating slide-out room comprising:
   a) a main living area structure including a main floor and a wall defining a main living area, an aperture in said wall, and a recess in said main floor extending to said aperture and being defined by a sub-floor located lower than said main floor;
   b) a slide-out room including an auxiliary floor having an interior edge and being movable relative to the main living area through said aperture between a retracted position within the main living area with said auxiliary floor located above the main floor and an extended position forming an auxiliary living area protruding outwardly from said main living area with said auxiliary floor located over said sub-floor in a substantially flush and parallel relationship with said main floor;

c) means for supporting said slide-out room from said main living area structure when the slide-out room is in said extended position; and d) an actuating mechanism for moving said slide-out room between said retracted and extended positions, said actuating mechanism including an extendable drive attached by a first connection to said slide-out room and attached by a spaced second connection to said main living area structure, said drive being shiftable relative to said second connection with the second connection being shiftable relative to said main living area structure to facilitate movement of said auxiliary floor between the retracted and extended positions of said slide-out room, said extendable drive being located within said slide-out room, and a slide-away through said auxiliary floor aligned with said extendable drive defining a travel path of said second connection relative to said slide-out room.

2. The mobile living quarters of claim 1 and a ramp extending between said main floor and said sub-floor.

3. The mobile living quarters of claim 2 and a bevel on said interior edge of said auxiliary floor, said bevel being complementary to said ramp for providing a camming surface to facilitate movement of said slide-out room between said extended and retracted positions.

4. The mobile living quarters of claim 1 further comprising a resilient cord retractor for carrying a power cord for powering said actuating system, said cord retractor including a) a stiff elongated arm member pivotally attached to said sub-floor at one end and pivotally shiftable between extended and retracted positions; and b) a flexible resilient member for providing a force to urge said elongated member from said extended position to said retracted position, said flexible resilient member having two ends, one end attached to said main living area structure and the other end attached to said elongated member;

whereby said cord between said actuating system and said retractor is maintained generally taught as said slide-out room shifts between said extended and retracted positions.

5. Mobile living quarters with a flush-seating slide-out room comprising:

a) a main living area structure including a main floor and a wall defining a main living area, an aperture in said wall, and a recess in said main floor extending to said aperture and being defined by a sub-floor located lower than said main floor;

b) a slide-out room including an auxiliary floor having an interior edge and being movable relative to the main living area through said aperture between a retracted position within the main living area with said auxiliary floor located above the main floor and an extended position forming an auxiliary living area protruding outwardly from said main living area with said auxiliary floor located over said sub-floor in a substantially flush and parallel relationship with said main floor;

c) means for supporting said slide-out room from said main living area structure when the slide-out room is in said extended position; and d) an actuating mechanism for moving said slide-out room between said retracted and extended positions, said actuating mechanism including an extendable drive attached by a first connection to said slide-out room and attached by a spaced second connection to said main living area structure, said drive being shiftable relative to said second connection with the second connection being shiftable relative to said main living area structure to facilitate movement of said auxiliary floor between the retracted and extended positions of said slide-out room, said spaced second connection comprising a three-leaf, dual-axis hinge with an upper leaf thereof anchored to said extendable drive and a lower leaf thereof anchored to said sub-floor.

6. The mobile living quarters of claim 5 wherein said means for supporting said slide-out room comprises a linkage system with a first slidable pivot connection to said main living area structure and a shiftable second pivot connection to said slide-out room.

7. The mobile living quarters of claim 6 wherein said extendable drive comprises a rotatable jack screw, said second connection including a gear nut threaded upon said jack screw and connected to said hinge upper leaf.

8. The mobile living quarters of claim 7 wherein said actuating mechanism further comprises an actuator connected to said jack screw for turning said jack screw.

9. The mobile living quarters of claim 8 wherein said actuator comprises an electric motor.

* * * * *